L. LITCHFIELD & J. S. CORBIN.
Horse-Hay Rakes.
No. 140,513.                                    Patented July 1, 1873.
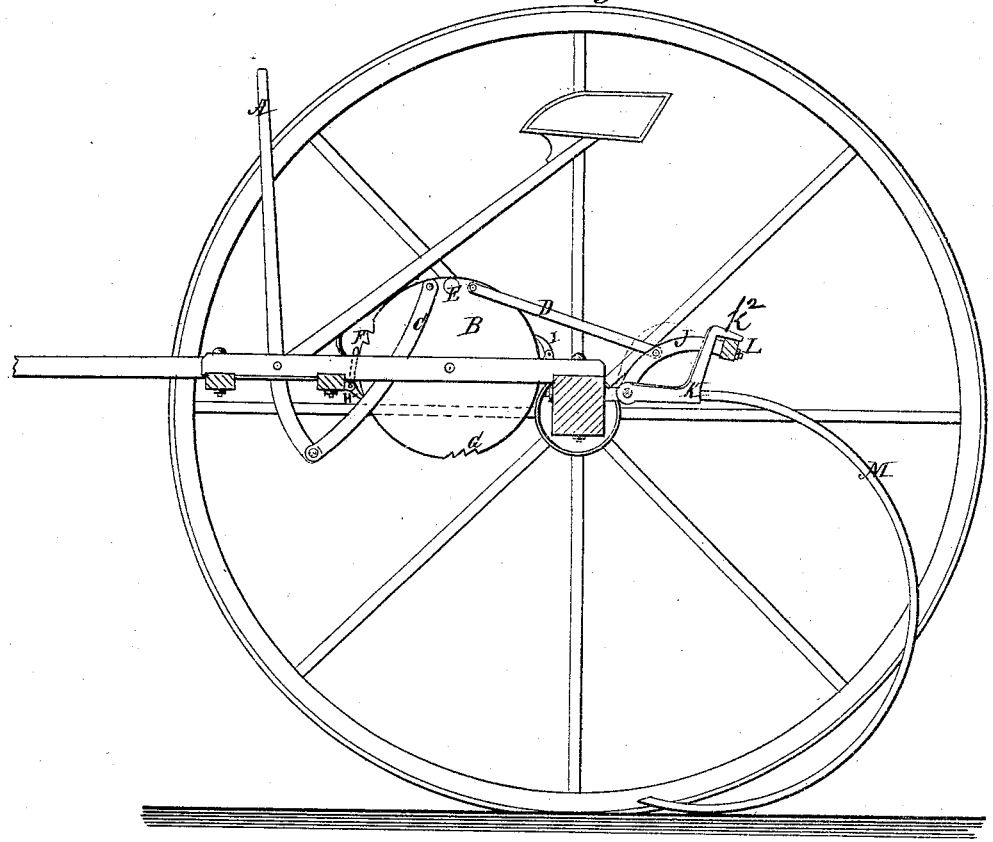
Witnesses:
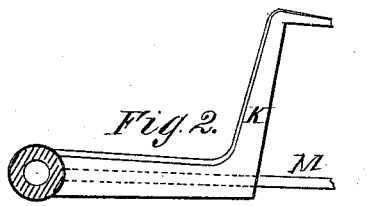
Inventors:
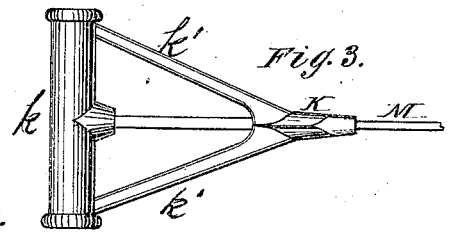

UNITED STATES PATENT OFFICE.

LYMAN LITCHFIELD AND J. SPENCER CORBIN, OF GOUVERNEUR, N. Y.

IMPROVEMENT IN HORSE HAY-RAKES.

Specification forming part of Letters Patent No. 140,513, dated July 1, 1873; application filed June 6, 1873.

*To all whom it may concern:*

Be it known that we, LYMAN LITCHFIELD and J. SPENCER CORBIN, of Gouverneur, St. Lawrence county, New York, have invented certain Improvements in Horse Hay-Rakes, of which the following is a specification:

The invention consists in the improvement of horse-rakes, as hereinafter described and pointed out in the claims.

Figure 1 is a side elevation of a rake embodying our inventions. Fig. 2 is a side elevation of the tooth-head. Fig. 3 is a vertical elevation of the tooth-head. Fig. 4 is a front elevation of the disk or ratchet-wheel, showing foot-pin.

A is a hand-lever pivoted to the frame of the rake, its lower end being connected with the disk or ratchet-wheel B by a single or double strap of iron, C. D is a single or double connecting iron strap, joining the disk or ratchet-wheel to the rider-bar holder J. This holder swings upon the rod upon which the teeth are pivoted. E is a pin projecting from the face of the disk or ratchet-wheel in easy reach of the foot of the operator.

The pawl I is thrown back in ordinary use, when it is desired to have the teeth follow the ground closely, but in raking grain or high stubble the teeth are slightly elevated and held by this pawl engaging with the tooth G of the disk or ratchet-wheel.

K is the tooth-head, preferably made of cast-iron, and is provided with a sleeve for pivoting it upon the rod in rear of and parallel to the axle. It is also provided with an arm or standard projecting upward and backward in such a manner as to take hold of the lifting-bar L. This arm or standard is of sufficient length to permit the necessary independent play of each tooth.

I claim—

1. The combination, with lifting-bar L fastened on holder J, and a wheel, B, connected with the latter by pivoted straps, of the foot-pin E and hand-lever device A C, operated simultaneously, as and for the purpose described.

2. A disk-wheel, B, having ratchet-teeth placed at intervals on the periphery with a smooth space between them, combined with the pawl I to operate the rake-lifting mechanism, as and for the purpose set forth.

3. The tooth-head K, consisting of sleeve $k$ and standard $k^2$ attached together by arms $k^1$, as specified.

LYMAN LITCHFIELD.
J. S. CORBIN.

Witnesses:
THOMAS CARROLL,
GEO. PARKER.